US009686554B2

(12) United States Patent
Annamraju et al.

(10) Patent No.: US 9,686,554 B2
(45) Date of Patent: Jun. 20, 2017

(54) ENCODER ADAPTATION

(71) Applicant: Imagination Technologies Limited, Kings Langley (GB)

(72) Inventors: Venu Annamraju, Hyderabad (IN); Harish Rajamani, Hyderabad (IN); Mallikarjuna Kamarthi, Hyderabad (IN)

(73) Assignee: Imagination Technologies Limited, Kings Langley (GB)

( * ) Notice: Subject to any disclaimer, the term of this patent is extended or adjusted under 35 U.S.C. 154(b) by 182 days.

(21) Appl. No.: 14/568,748

(22) Filed: Dec. 12, 2014

(65) Prior Publication Data

US 2015/0172668 A1   Jun. 18, 2015

(30) Foreign Application Priority Data

Dec. 16, 2013 (GB) .................................. 1322212.0

(51) Int. Cl.
| | |
|---|---|
| *H04N 19/136* | (2014.01) |
| *H04N 19/115* | (2014.01) |
| *H04N 19/187* | (2014.01) |
| *H04N 19/196* | (2014.01) |
| *H04N 19/172* | (2014.01) |
| *H04N 19/152* | (2014.01) |
| *H04N 19/423* | (2014.01) |
| *H04N 19/31* | (2014.01) |
| *H04N 19/44* | (2014.01) |
| *H04N 19/88* | (2014.01) |
| *H04N 19/89* | (2014.01) |

(Continued)

(52) U.S. Cl.
CPC ......... *H04N 19/136* (2014.11); *H04N 19/115* (2014.11); *H04N 19/124* (2014.11); *H04N 19/132* (2014.11); *H04N 19/152* (2014.11); *H04N 19/156* (2014.11); *H04N 19/172* (2014.11); *H04N 19/187* (2014.11); *H04N 19/196* (2014.11); *H04N 19/31* (2014.11); *H04N 19/423* (2014.11); *H04N 19/44* (2014.11); *H04N 19/88* (2014.11); *H04N 19/89* (2014.11)

(58) Field of Classification Search
CPC .. H04N 19/136; H04N 19/115; H04N 19/187; H04N 19/196; H04N 19/31
USPC ....................................................... 375/3, 4
See application file for complete search history.

(56) References Cited

U.S. PATENT DOCUMENTS

| 6,567,117 B1 | 5/2003 | Nago et al. |
| 7,804,897 B1 | 9/2010 | Pun et al. |

(Continued)

*Primary Examiner* — Neil Mikeska
(74) *Attorney, Agent, or Firm* — Vorys, Sater, Seymour and Pease LLP; Vincent M DeLuca

(57) ABSTRACT

An adaptive control system for a media encoder configured to encode a media data stream in accordance with a set of one or more encode parameters, the system comprising: an input queue for receiving a sequence of data portions representing a media stream; and an adaptation controller configured to form an accumulation parameter indicative of an incidence of accumulation events at the input queue, each accumulation event representing the reception of an incoming data portion into the input queue while a previous data portion in the sequence is in the input queue; the adaptation controller being configured to control the encode parameters of the media encoder in dependence on the accumulation parameter.

17 Claims, 5 Drawing Sheets

(51) Int. Cl.
*H04N 19/124* (2014.01)
*H04N 19/132* (2014.01)
*H04N 19/156* (2014.01)

(56) References Cited

U.S. PATENT DOCUMENTS

| | | | | |
|---|---|---|---|---|
| 8,175,147 B1 * | 5/2012 | Webb | H04N 19/197 | 348/497 |
| 2002/0012395 A1 * | 1/2002 | Song | H04N 19/197 | 375/240.03 |
| 2004/0017850 A1 * | 1/2004 | Kim | H04N 19/147 | 375/240.01 |
| 2005/0180500 A1 | 8/2005 | Chiang et al. | | |
| 2005/0201460 A1 * | 9/2005 | Kang | H04N 19/159 | 375/240.03 |
| 2005/0249287 A1 * | 11/2005 | Kondo | H04N 19/176 | 375/240.16 |
| 2009/0086816 A1 * | 4/2009 | Leontaris | H04N 19/176 | 375/240.03 |
| 2009/0103609 A1 * | 4/2009 | Jiang | H04N 19/152 | 375/240.03 |
| 2010/0054329 A1 * | 3/2010 | Bronstein | H04N 19/147 | 375/240.03 |
| 2015/0172668 A1 * | 6/2015 | Annamraju | H04N 19/172 | 375/240.06 |

* cited by examiner

ENCODER ADAPTATION

BACKGROUND OF THE INVENTION

This invention relates to an adaptive control system for a media encoder.

In real-time video telephony, dynamic and high system loads at a transmitting device supporting a video encoder can lead to degradation of video quality at the receiving device due to overload of the video encoder. This can be observed in the received video stream as increased end-to-end delays, delay spikes, frame freezes and jerky play-out. It is therefore important to ensure that the demands made of a video encoder are well-matched to its capabilities. This is generally straightforward to achieve for any given device, but presents a significant challenge when the video encoder might be supported at a wide range of different devices.

In order to estimate the capabilities of a video encoder as embodied at a given device, a combination of two different types of metrics is usually employed. Static metrics provide a measure of the theoretical performance of the architecture in which the video encoder is supported. For a software encoder, static metrics might include maximum processor frequency, system bus frequency, and the number of processor cores in the system. However, such metrics do not provide an accurate measure of the abilities of an encoder at a given point in time.

Dynamic metrics can help to improve the estimate of the capabilities of a video encoder by introducing measurements of the actual performance of the underlying device. For a software encoder, dynamic metrics might include process and thread execution times, measures of the idle time of a processor, and current processor frequency. However, such dynamic metrics suffer from a variety of problems. For multi-threaded encoders, measurements of execution times are unreliable due to context switching. And in systems having multiple cores, average measurements of idle time can be unreliable because some cores might be lightly loaded while others are overloaded.

In modern systems, the problems of using existing metrics as estimates of the load on a software video encoder can be even more acute. Multi-threading, virtualization and the use of logical processors all pose further problems to the use of static metrics. Often systems also make use of voltage and frequency scaling, as well as dynamically switching on and off processor cores, to improve energy efficiency, particularly in portable devices.

It can be more difficult to estimate the load on a hardware video encoder because the capabilities of the hardware video encoder are often largely independent of the capabilities of the device at which it is provided. For example, while a CPU of the device is largely idling, the hardware encoder might be fully loaded. In devices that make use of hardware encoders in the encoder pipeline the use of conventional static and dynamic metrics to estimate encoder load can be wholly inaccurate.

As well as leading to poor adaptation of an encoder to its real-time capabilities, the use of existing metrics as a measure of encoder load make it difficult to accurately perform dynamic calibration of a video encoder. This is because conventional calibration mechanisms generally require some measure of encoder load in order to judge when the processing capabilities of the encoder are exceeded.

The above issues are not limited to video encoders, with other types of media encoder facing similar problems.

BRIEF SUMMARY OF THE INVENTION

According to a first aspect of the present invention there is provided an adaptive control system for a media encoder configured to encode a media data stream in accordance with a set of one or more encode parameters, the system comprising:

an input queue for receiving a sequence of data portions representing a media stream; and an adaptation controller configured to form an accumulation parameter indicative of an incidence of accumulation events at the input queue, each accumulation event representing the reception of an incoming data portion into the input queue whilst a previous data portion in the sequence is in the input queue; the adaptation controller being configured to control the encode parameters of the media encoder in dependence on the accumulation parameter.

In embodiments of the invention, machine readable code can be provided for generating the adaptive control system. In embodiments of the invention, a machine readable storage medium having encoded thereon non-transitory machine readable code can be provided for generating the adaptive control system.

The adaptation controller may be configured to control the encode parameters of the media encoder so as to adapt the encoding performed by the media encoder in response to variations in resources available to the media encoder.

The accumulation parameter may represent a measure of the proportion of data portions received into the input queue that result in accumulation events.

The accumulation parameter may be calculated in respect of an accumulation interval such that the accumulation parameter is indicative of an incidence of accumulation events at the input queue within the accumulation interval.

Each data portion may have an associated timestamp and the adaptation controller may be configured to:

on each accumulation event occurring in the input queue within the accumulation interval, calculate the time difference between the timestamp of the incoming data portion and the timestamp of the previous data portion; and form the accumulation parameter by summing over the time differences calculated in respect of the accumulation events occurring within the accumulation interval and expressing the sum of the time differences as a proportion of the accumulation interval.

The adaptation controller may be configured to, on reaching the end of the accumulation interval, control the set of encode parameters of the media encoder in dependence on the accumulation parameter calculated in respect of the accumulation interval.

The adaptation controller may be configured to use the accumulation parameter as a measure of load on the media encoder in an adaptation algorithm arranged to control the set of encode parameters of the media encoder so as to substantially maintain the load on the media encoder within predetermined bounds.

The adaptation controller may be configured to use the accumulation parameter as a measure of load on the media encoder by comparing the accumulation parameter to a set of threshold values so as to identify a corresponding one of a plurality of load metrics for use in the adaptation algorithm.

The adaptation controller may be configured to make use of a hysteresis component in performing said comparison so as to prevent changes in the load metric due to small changes in the accumulation parameter.

The hysteresis component may be approximately 10% of a normalized maximum of the accumulation parameter.

The adaptive control system may further comprise a data store holding a hierarchy of sets of one or more encode parameters each having an associated demand on the media encoder, wherein the adaptation controller may be arranged to select between causing the media encoder to:
  maintain its current set of encode parameters;
  adapt upward to a set of encode parameters associated with a greater demand on the media encoder; and
  adapt downward to a set of encode parameters associated with a lesser demand on the media encoder;
in dependence on the measure of load represented by the accumulation parameter.

The associated demand held in the data store for each set of encode parameters may represent a minimum data processing rate required of the media encoder.

The media stream may be a video stream and the minimum data processing rate may represent a rate of macro block processing.

The adaptation controller may be configured to, in response to causing the media encoder to adapt upwards and subsequently to adapt back downwards within a predetermined length of time, not cause the media encoder to adapt upwards within an adaptation interval.

The adaptation interval may be calculated by increasing the current value of the adaptation interval substantially in proportion to the current value of the adaptation interval.

The adaptation interval may be calculated by increasing the current value of the adaptation interval substantially in proportion to the ratio of a measure of the demand on the media encoder associated with the next encode parameters up in the hierarchy to a measure of the demand on the media encoder associated with the current encode parameters in the hierarchy.

The adaptation controller may be further configured to control the encode parameters of the media encoder in dependence on one or more additional parameters of the adaptive control system or its environment.

The previous data portion may be the data portion immediately preceding the incoming data portion in the sequence of data portions.

Each data portion received into the input queue may include an associated timestamp.

The sequence of data portions may be received at the input queue such that consecutive data portions in the sequence are received spaced apart in time substantially in accordance with their respective timestamps.

The media stream may be a video stream and the encode parameters include one or more of frame rate, frame resolution and a target bitrate for the encoded data stream.

Each data portion of the sequence of data portions received at the input queue may be a video frame.

The input queue may be decoupled from the source of the data portions such that the rate of reception of data portions at the input queue does not depend on the rate of encoding of the data portions by the media encoder.

According to a second aspect of the present invention there is provided a method of controlling a media encoder for encoding a media data stream in accordance with a set of one or more encode parameters, the method comprising:
  receiving a sequence of data portions representing a media stream; and
  forming an accumulation parameter indicative of an incidence of accumulation events at the input queue, each accumulation event representing the reception of an incoming data portion into the input queue whilst a previous data portion in the sequence is in the input queue; and
  controlling the encode parameters of the media encoder in dependence on the accumulation parameter.

Each data portion may have an associated timestamp and the step of forming an accumulation parameter may comprise:
  on each accumulation event occurring in the input queue within the accumulation interval, calculating a time difference between the timestamp of the incoming data portion and the timestamp of the previous data portion;
  summing over the time differences calculated in respect of the accumulation events occurring within the accumulation interval; and
  expressing the sum of the time differences as a proportion of the accumulation interval, said proportion being the accumulation parameter.

In embodiments of the invention, machine readable code can be provided for implementing the method of controlling a media encoder. In embodiments of the invention, a machine readable storage medium having encoded thereon non-transitory machine readable code can be provided for implementing the method of controlling a media encoder.

There is provided a data processing system for calibrating a media codec operable to encode and decode a media stream comprising a sequence of time-stamped frames, the data processing system comprising:
  an encoder subsystem configured to perform encoding in accordance with one or more encode parameters;
  a decoder subsystem; and
  a calibration system comprising:
    a data store for storing an encoded media stream; and
    a calibration monitor configured to, on the media codec entering a calibration mode, cause:
      the decoder subsystem to decode the encoded media stream so as to generate a decoded media stream;
      the encoder subsystem to re-encode said decoded media stream; and
      the re-encoded media stream to pass back into the decoder subsystem;
the calibration monitor being configured to, through variation of the encode parameters of the encoder subsystem, identify maximal encode parameters corresponding to the greatest steady-state demand on the media codec that permits decoding of the sequence of time-stamped frames at a rate in accordance with their associated timestamps.

In embodiments of the invention, machine readable code can be provided for generating the data processing system. In embodiments of the invention, a machine readable storage medium having encoded thereon non-transitory machine readable code can be provided for generating the data processing system.

The calibration monitor may be configured to vary the encode parameters of the encoder and decoder subsystems in accordance with a predetermined algorithm so as to identify the maximal encode parameters.

The media codec may be adaptive and the calibration monitor is configured to allow the encode parameters of the encoder subsystem to adapt according to an adaptation algorithm of the encoder subsystem.

The decoder subsystem may be configured to perform encoding in accordance with one or more decode parameters, and the calibration monitor may be further configured to, through variation of the decode parameters of the decoder subsystem, identify maximal decode parameters corresponding to the greatest steady-state demand on the media codec that permits decoding of the sequence of time-stamped frames at a rate in accordance with their associated timestamps.

The data processing system may further comprise a network simulation unit for connection between the encoder and decoder subsystems and configured to introduce network characteristics calculated according to a predefined model into an encoded media stream passing through it, the calibration monitor being configured to cause the re-encoded media stream to pass through the network simulation unit before passing back into the decoder subsystem.

Suitably the network characteristics include one or more of data loss, data errors and jitter.

The predefined model may be configured so as to cause network characteristics to be introduced on a pseudo-random basis.

The encoder subsystem may comprise a pre-processor and an encoder, the encoder being configured to perform encoding in accordance with one or more encode parameters and the pre-processor being arranged before the encoder in the encoder subsystem, wherein the pre-processor is configured to rescale at least some of the sequence of time-stamped frames received from the decoder subsystem.

The pre-processor may be configured to rescale at least some of the sequence of time-stamped frames by reducing the size of those frames.

The calibration monitor may be configured to cause the encoder subsystem to sleep for a determined period of time following each successfully encoded frame, said period of time being determined so as to cause the encoder subsystem to become overloaded by the encoded media stream.

There is provided a method of calibrating a media codec for encoding and decoding a media stream comprising a sequence of time-stamped frames, the media codec comprising an encoder subsystem configured to perform encoding in accordance with one or more encode parameters and a decoder subsystem, the method comprising:
  playing out a stored encoded media stream to the decoder subsystem so as to cause the decoder subsystem to decode the encoded media stream and generate a decoded media stream;
  causing the encoder subsystem to re-encode said decoded media stream;
  looping the re-encoded media stream back into the decoder subsystem; and
  through variation of the encode parameters of the encoder subsystem, identifying maximal encode parameters corresponding to the greatest steady-state demand on the media codec that permits decoding of the sequence of time-stamped frames at a rate in accordance with their associated timestamps.

In embodiments of the invention, machine readable code can be provided for implementing the method of calibrating a media codec. In embodiments of the invention, a machine readable storage medium having encoded thereon non-transitory machine readable code can be provided for implementing the method of calibrating a media codec.

BRIEF DESCRIPTION OF THE DRAWINGS

The present invention will now be described by way of example with reference to the accompanying drawings. In the drawings.

DETAILED DESCRIPTION OF THE INVENTION

The following description is presented by way of example to enable any person skilled in the art to make and use the invention. The present invention is not limited to the embodiments described herein and various modifications to the disclosed embodiments will be readily apparent to those skilled in the art.

There is a need for an adaptive control system that provides improved encoder performance across a wide range of encoder architectures by minimising, or reducing, overload conditions, as well as an improved calibration system for such encoders.

An adaptive control system is provided with an adaptation controller configured to control encode parameters of a media encoder in accordance with an accumulation parameter. The accumulation parameter may be formed so as to be indicative of an incidence of accumulation events, wherein each accumulation event represents the reception of a new data buffer into an input queue of the adaptive control system whilst an earlier data buffer is in the input queue. The accumulation parameter is useful as a measure of load on a media encoder, particularly for a media encoder arranged to perform real-time encoding of media buffers such as a media encoder in a real-time video telephony system.

Figure 1:
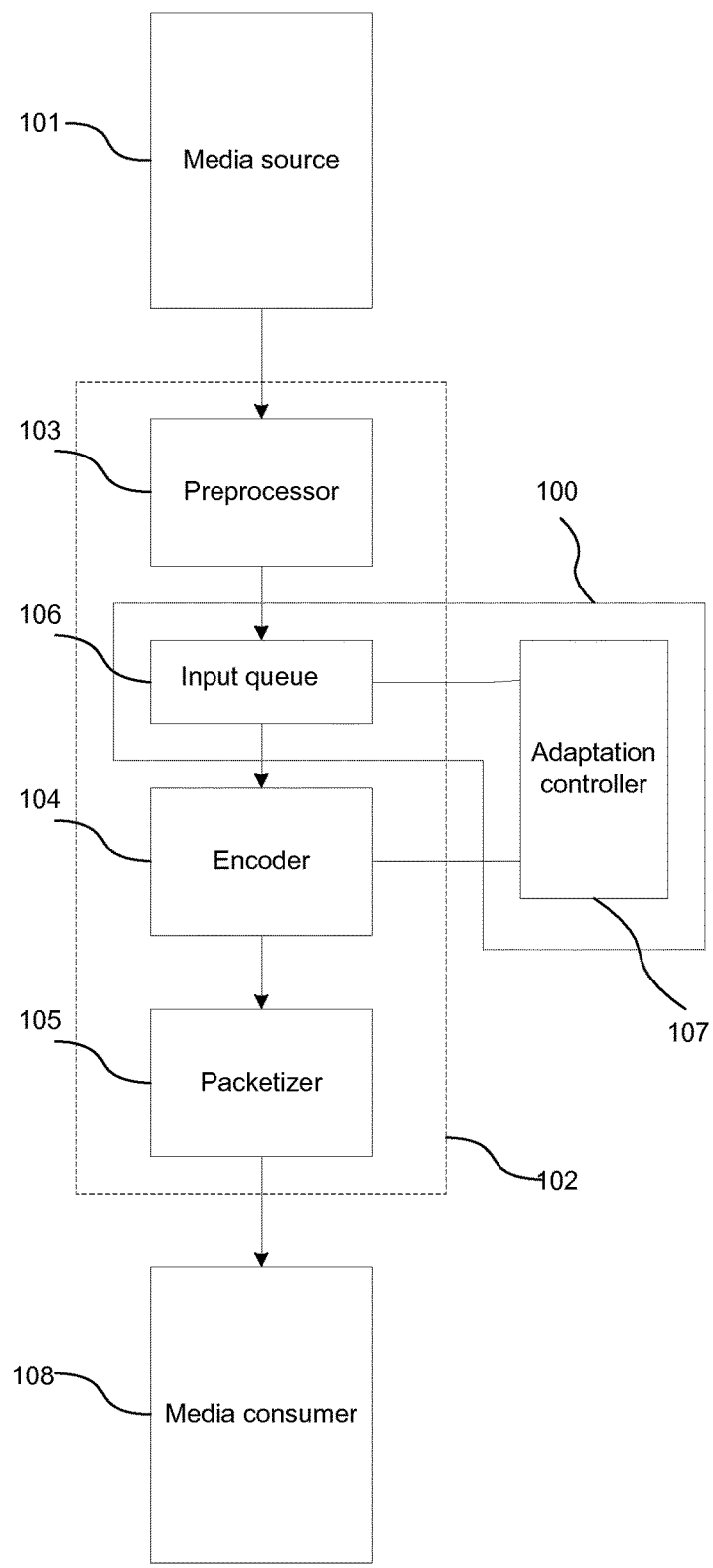
FIG. 1 is a schematic diagram of an adaptive control system.

FIG. 1 is a schematic diagram of a data processing system having an adaptive control system 100 for controlling an encoder 104 of an encoder subsystem 102. The adaptive control system 100 comprises an input queue 106 and adaptation controller 107. The adaptive control system 100 may operate on an encoder 104 arranged to encode buffers received into the input queue. The term "buffer" is used herein to refer to a portion of data on which the encoder 104 can operate. Along with the input queue 106, encoder 104 forms part of an encoder subsystem 102 which receives a media stream comprising a sequence of data buffers from media source 101 and provides an encoded media stream to media consumer 108. The media stream could be any kind of media stream, such as a video and/or audio stream.

The encoder subsystem optionally further comprises a preprocessor 103 for processing data buffers received from the media source prior to encoding, and a packetizer 105 for forming the encoded media stream into packet-sized chunks of payload data.

The encoder 104 performs encoding of the received media stream in accordance with one or more encode parameters controlled by the adaptation controller 107. These parameters determine, for a given source media stream, the nature of the encoding performed by the encoder 104. For example, the encode parameters could define the encoding format to be used, a target bitrate, a level of compression, and/or settings particular to the encoding format in use at the encoder 104. In the event the media stream is a video stream, the encode parameters could include, for example, a video format, a frame size and a target frame rate.

Broadly speaking, the role of the adaptation controller 107 is to adapt the encode parameters of the encoder 104 so as to match the resources required by the encoding process to the resources available at the encoder 104. This is achieved by means of an accumulation parameter.

The adaptive control system 100 will now be described by way of example with reference to a media encoder in which: the media source is a camera providing a stream of video frames; the encoder subsystem is configured to generate an encoded media stream from the video frames; and the media consumer is a transmission subsystem for transmitting the encoded media stream generated by the encoder over a network. Such an encoder subsystem might, for instance, be employed to perform encoding of video frames for real-time video telephony.

In other embodiments, the media source could be, for example, a data store from which a sequence of data buffers representing a media stream is played-out, an entity for synthesizing a media stream, or a receiver arranged to provide a sequence of data buffers received over a network. And the media consumer could alternatively be, for example, a data store for storing the encoded media stream, or a display system for displaying the encoded data stream.

In the present embodiment, the stream of video frames received from the camera is initially received by preprocessor 103, which can process frames prior to encoding by performing functions such as colour conversion, frame rescaling, frame rotation and/or mirroring. The processed frames then pass onto the encoder 104 for encoding before being formed into data packets at packetizer 105. The transmission subsystem therefore receives an encoded media stream in the form of a sequence of data packets on which transmit processing can be performed so as to generate a flow of network packets for transmission over the network. Various quality of service protocols may be in use over the network with the aim of maintaining a robust transport mechanism for the network packets; such protocols will not be discussed here.

The resources available to the encoder 104 will generally vary over time in response to other demands on the system at which the encoder is supported and factors such as power saving measures, thermal throttling or load-dependent frequency scaling which can lead to sudden changes in the frequency at which a processor used by the encoder 104 is clocked. For example, if the encoder 104 is a software process, the encoder 104 would typically share its resources with other processes running at the processor at which it is supported. The load on the encoder 104 at any given moment in time therefore depends on the processing demand on the encoder 104 (e.g. in macroblocks per second) relative to the resources available to the encoder 104.

In the event the resources available to the encoder 104 drop below the level required to maintain a particular rate of processing (e.g. in macroblocks per second), the encoder 104 would become overloaded and the rate at which frames are encoded would fall below the rate at which frames are being received at the encoder subsystem 102. In a real-time video telephony context, this can lead to problems such as increased end-to-end delays, delay spikes, frame freezes and jerky play-out at a receiver of the encoded stream.

The adaptive control system 100 described herein provides a mechanism for dynamically adapting the encode parameters of the encoder 104 so as to avoid overloading the encoder 104. This is achieved by identifying accumulation events occurring at the input queue 106, as will now be described with reference to FIG. 3.

Figure 3:
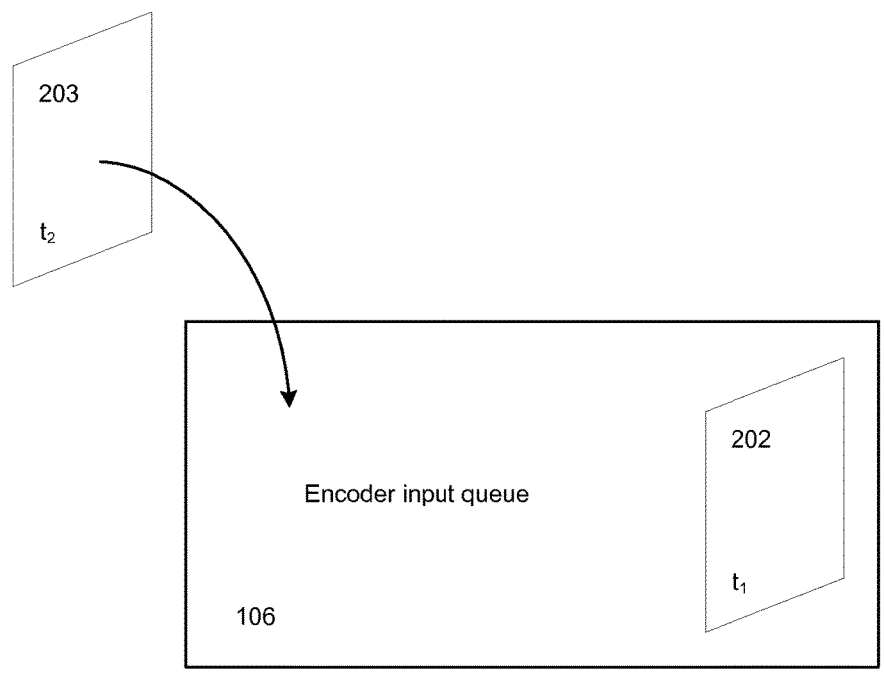
FIG. 3 shows a frame being receiving into an input queue in which a previous frame of the stream is already present.

The encoder 104 is configured to process data buffers received into the input queue. For a given input media stream, if the encoder is not to fall behind, the encoder should complete the encoding of a data buffer in time for the next data buffer to be received into the input queue 106. In other words, the input queue would ideally be empty each time a new data buffer is received into it. With reference to FIG. 3, an accumulation event occurs when a previous data buffer 202 is present in the input queue 106 at the point when a new data buffer 203 is received into the input queue 106. This is indicative that the load on the encoder 104 has at least momentarily increased above a level at which the current rate of processing can be maintained. The incidence of accumulation events can be expressed as an accumulation parameter and used as a measure of the severity of the load on the encoder. It is noted that for a constant frame rate source, the accumulation parameter is proportional to the number of accumulation events occurring within the accumulation interval. However, in typical scenarios where camera sensors adjust exposure time in response to lighting conditions, the proportionality to number of events does not always hold. In such cases, it is advantageous to use a time-interval based approach rather than an event rate approach, an example of which will now be described.

Figure 2:
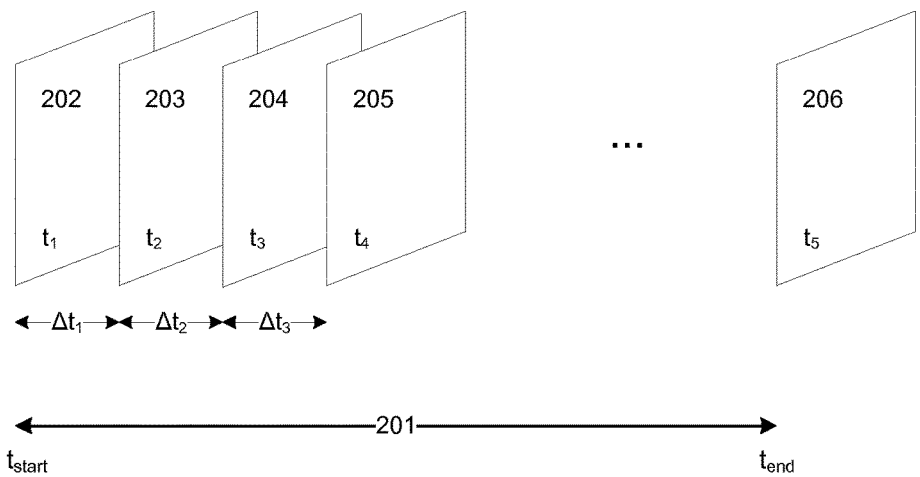
FIG. 2 shows a stream of frames within an accumulation interval.

One way of calculating an accumulation parameter in the context of the present embodiment is as follows. FIG. 2 shows a stream of frames 202 to 206 that are received from the camera into the input queue over the course of an accumulation interval 201 that extends between $t_{start}$ and $t_{end}$. A period of around 1 second is typically a suitable length of time for the accumulation interval 201 in a media encoder adapted for real-time video telephony. Each frame is associated with a timestamp $t_i$, which could be a timestamp applied to the frames at the camera, or could be applied at the encoder subsystem 102 or adaptive control system 100 (e.g. on reception at the input queue 106).

In the present embodiment, frames would typically be received from the camera in real-time. For example, if the camera is operating at 10 frames per second, 10 frames would be received into the input queue 106 every second. In other words, frames 202 to 206 are received at a rate commensurate with the rate of frame acquisition at the camera. Each adjacent pair of frames of the media stream from the camera is spaced apart by a respective time $\Delta t_i$, which can vary (possibly within an accumulation interval) depending on the frame rate. For example, if frames 202 and 203 are generating according to a frame rate of 10 frames per second, $\Delta t_1$ would be 0.1 s.

With reference again to FIG. 3, in order to calculate the accumulation parameter, each time an accumulation event occurs, the difference in time $t_2 - t_1$ between the timestamp $t_2$ of the current incoming frame 203 and the timestamp $t_1$ of the previous frame 202 is calculated. This time difference is equal to $\Delta t_1$ as shown in FIG. 2. Within the accumulation interval 201, these time differences are summed (i.e. accumulated) so as to provide a total of all of the time differences calculated in respect of accumulation events. A normalized value for the accumulation parameter in respect of that accumulation interval can then be formed by dividing the total of the time differences by the length of the accumulation interval:

$$\text{accumulation parameter} = \frac{\left(\sum \text{time differences}\right) * 100}{t_{end} - t_{start}}$$

An accumulation parameter of zero therefore indicates that there were no accumulation events within the accumulation interval. An accumulation parameter of 100 indicates that every incoming frame received within the accumulation interval was received when a previous frame was present in the buffer because the sum of the time differences is equal to the length of the accumulation interval (in the event of significant jitter or delays occurring on the data path between the camera and input queue this may not always be exactly true, but the accumulation parameter nonetheless remains a useful metric by which to judge the load on the encoder). A value between 0 and 100 indicates that some of the incoming frames resulted in accumulation events. Since each accumulation event is indicative of a failure of the encoder to keep up with the incoming stream of frames, the accumulation parameter therefore provides a useful measure of the average load at the encoder. The accumulation parameter can therefore provide an indication of the incidence rate of accumulation events at the input queue 106. As has been described in the above example, the incidence rate can be time-weighted by the interval between frames, as determined by the frame rate.

In a real-time video telephony context, it is preferred that the accumulation parameter calculated in respect of an accumulation interval replaces any previous value for the accumulation parameter. This ensures that the encode parameters are rapidly adapted to changes in load at the encoder 104. Alternatively, the accumulation parameter could include contributions from previous intervals (e.g. a weighted sum of the accumulation parameters for the most recent and the previous accumulation interval, with the accumulation parameter for the most recent interval receiving a greater weighting). In still further variations, the accumulation parameter could be constantly updated through an accumulation interval in response to accumulation events. The accumulation interval could extend over any number of frames, including one frame. The choice of length of the accumulation interval is likely to depend on the characteristics of the particular encoder and the type of media stream being encoded.

It should be appreciated that the above paragraphs merely provide one possible definition of an accumulation parameter, and many other similar parameters could be readily derived that give an indication of the incidence of accumulation events, with all such parameters being accumulation parameters. The incidence of accumulation events can be a measure of the rate at which accumulation events occur within the accumulation interval, with each accumulation event preferably being weighted according to the interval between frames at the time the accumulation events occurs—this allows the accumulation event to provide an accurate measure of encoder load even when the frame rate changes during an accumulation interval.

The adaptation controller 107 is configured to use the accumulation parameter as a measure of load on the encoder 104 and hence control the encode parameters of the encoder so as to respond to changes in resources available to the encoder. For example, if the accumulation parameter increases above a threshold, or is above a threshold for a predefined length of time, the adaptation controller 107 could adapt the encode parameters of the encoder 104 so as to reduce the processing demand on the encoder—say, by reducing the frame resolution parameter from 720p HD to 480p SD. To give a second example, if the accumulation parameter remains below a threshold for a predefined length of time, the adaptation controller 107 could adapt the encode parameters of the encoder 104 so as to increase the processing demand on the encoder—say, by increasing the frame rate parameter from 15 fps to 30 fps. Such behaviour is typically regulated by an adaptation algorithm which may in fact receive further inputs that together determine whether in fact adaptation of the encoder occurs. For example, if the encoded media stream is transmitted over a network, adaptation may further depend on there being available network bandwidth.

By recognising that the accumulation parameter can be used as a measure of encoder load, the adaptation controller 107 can be configured in accordance with any adaptation algorithm suitable for use with the encoder 104. It can be useful to define a hierarchy of parameters, with those parameters that place the greatest demand on the encoder and relating to the highest encode quality at the top of the hierarchy, and those parameters that place the least demand on the encoder and relating to the lowest encode quality at the bottom of the hierarchy. On determining that the demand on the encoder 104 is to be increased/reduced—for example, in accordance with an adaptation algorithm—the adaptation controller 107 can then cause the encoder to select parameters up/down the hierarchy.

The hierarchy of encode parameters could be held in a data store accessible to the adaptation controller—for example, in a lookup table into which lookups are performed by the adaptation controller in accordance with its determination to increase or decrease demand on the encoder.

It can be useful to classify the accumulation parameter with respect to one or more threshold values and use the classification identified by the adaptation controller as a representation of load at the media encoder. In order to prevent the adaptation controller exhibiting unstable behaviour around any classification thresholds, it is advantageous to make use of an adaptation algorithm that employs hysteresis such that a change in classification depends on the classification of the accumulation parameter at the end of the previous accumulation interval as well as the apparent current classification of the accumulation parameter. This helps to avoid unnecessary back-and-forth switching of the load classification due to small fluctuations in the accumulation parameter close to a threshold value between load classifications.

An exemplary algorithm for classifying the accumulation parameter will now be described.

Three load classes are defined: HealthMetricPoor, HealthMetricModerate and HealthMetricGood, which correspond to high, medium and low load conditions at the media encoder. For a normalized accumulation parameter between 0 and 100, an accumulation parameter below 40 is considered to be in the HealthMetricGood class, between 40 and 80 is considered to be in the HealthMetricModerate class, and above 80 is considered to be in the HealthMetricPoor class. The lower and upper threshold values are therefore at 40 and 80, respectively. In this example the accumulation interval is one second, with the load classification being performed at the end of each accumulation interval. To improve the stability of the system, a hysteresis value of 10 is used, as will now be described. More generally the hysteresis value could be any suitable value: for example, the hysteresis value could be 5, 8, 10, or 12.

At the end of the first accumulation interval, the accumulation parameter is simply classified according to its magnitude and the above thresholds. For example, if the value of the accumulation parameter is initially 37 then it will be classified as load class HealthMetricGood. At the end of subsequent accumulation intervals, the accumulation parameter (acc_param) is classified according to the following pseudocode:

```
IF(acc_param < low threshold) THEN
    IF((acc_param + hysteresis) > low threshold)
        AND (previous load class > HealthMetricGood))
        THEN current load class = HealthMetricModerate
    ELSE current load class = HealthMetricGood
ELSE IF (acc_param < high threshold)
    IF((acc_param + hysteresis) > high threshold)
        AND(previous load class == HealthMetricPoor))
        THEN current load class = HealthMetricPoor
    ELSE current load class = HealthMetricModerate
ELSE IF (acc_param > high threshold)
    THEN current load class = HealthMetricPoor
previous load class = current load class
```

The current load class output by this pseudocode at the end of each accumulation interval can itself be used a measure of load on the encoder. For example, the current load class could be used in an adaptation algorithm arranged to determine whether the encode parameters of an encoder should remain the same, adapt upwards to increase the encode quality and place a lesser demand on the encoder, or adapt downwards to decrease the encode quality and place a lesser demand on the encoder. The hysteresis (which in this example is 10) acts to prevent switching between load classifications due to small fluctuations in accumulation parameter.

A very simple adaptation algorithm could be summarized as follows. If the accumulation parameter is classified as HealthMetricGood, adapt upward; if the accumulation parameter is classified as HealthMetricModerate maintain the current encode parameters; if the accumulation parameter is classified as HealthMetricPoor, adapt downward. Typically however, more sophisticated algorithms known in the art would be employed with a view to achieving better encoder performance. Encoder load is often just one of several parameters in accordance with which the encode parameters of an encoder are controlled. For encoded media streams transmitted over a network, encoder adaptation is typically also performed in dependence on measures of available network bandwidth such that adaptation does not simply depend on the outcome of an algorithm adapted to respond to encoder load. For example, if the outcome of adaptation in response to encoder load suggests that the encode parameters of the encoder should be adapted upwards, this may not occur if the available network bandwidth is insufficient to handle the increased bitrate of the encoded media stream. Encoder adaptation in response to changes in encoder load and encoder adaptation in response to changes in available network bandwidth could both be determined using a common adaptation algorithm, or by means of separate algorithms. Bandwidth adaptation would typically be performed prior to encoder load adaptation.

To avoid unstable cyclic switching behaviour, it can be useful to define a time interval that starts from any attempt by the adaptation controller to adapt upwards which resulted in the adaptation controller adapting back downwards at the end of the next accumulation interval. The adaptation controller is prevented from causing the encoder to adapt upwards within that time interval from the previous attempt to adapt upwards. Such a time interval could be fixed, but improved stability is observed with a time interval that varies in proportion to its current length and/or the ratio of the current encoder demand and the encoder demand associated with the next higher level of encode parameters in the hierarchy. This time interval can be calculated each time the adaptation controller tries to adapt upwards but falls back at the end of the next accumulation interval. If the time interval varies in proportion to its current length then it will vary exponentially.

Referring back to FIG. 1, it is advantageous if the adaptive control system 100 is implemented such that the encoder subsystem 102 on which it operates is decoupled from the media source 101 such that the rate of buffer generation by the media source does not depend on the buffer throughput of the encoder subsystem. For example, in the case that the encoder subsystem and media source are implemented as software processes, it is advantageous to perform minimal processing in the call back function of the media source. A Call back function is executable code passed from one piece of code as an argument to another piece of code so the latter can give a "call" back to the former to pass data, events and other information in response to events experienced by the latter. For example, if an encoder function were passed as a call back function to a camera thread, (i.e. were coupled together) then the camera thread could "call back" the encoder function along with camera data as captured by the camera sensor. The executable code in the call back function could use the camera data to perform encoding. Any subsequent processing in the camera thread would wait until all processing in that call back function is completed. In the present embodiment in which the media source is a camera, decoupling the camera thread from any intensive processing of encoder subsystem ensures that the camera does not skip frames due to load in the call back function. Decoupling the encoder subsystem from the media source also ensures that frames are delivered to the encoder subsystem as they are generated, rather than in response to some process completing at the encoder. This is significant because the adaptation mechanisms described herein can be to some extent driven by the timing at which frames are received into the input queue of the encoder.

Figure 4:
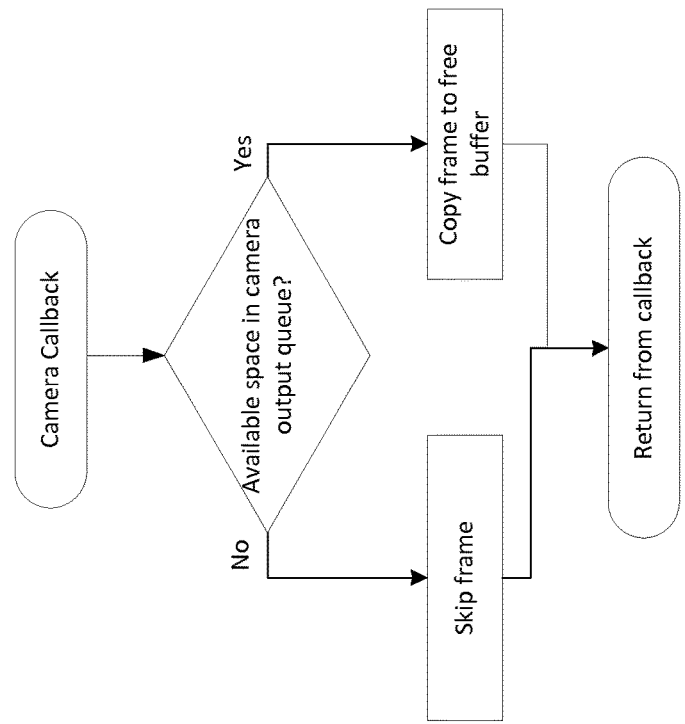
FIG. 4 illustrates an example of camera call back arrangement.

Decoupling of the media source from the encoder subsystem can be achieved through the use of buffer queues which allow the asynchronous operation of the components either side of the queue. For example, FIG. 4 illustrates a call back function called by a camera thread which checks whether there is available space in the output queue of the camera: if so, the acquired frame is copied to the output queue; if not, the frame is skipped. Once this operation has been performed, the call back function completes. Its completion does not depend on any process at the encoder subsystem (see FIG. 5) to complete and the camera and encoder are therefore decoupled.

Each of the pre-processor 103, encoder 104 and packetizer 105 in FIG. 1 can be provided with input and output queues in order to decouple the operation of the components of the encoder subsystem 102. The input queue 106 would in this case preferably be the input queue of the encoder so that the input queue monitored by the adaptation controller 107 is as close as possible to the encoder. Alternatively, input queue 106 as referred to herein could be any buffer queue prior to the encoder 104 in the encoder subsystem 102.

Figure 5:
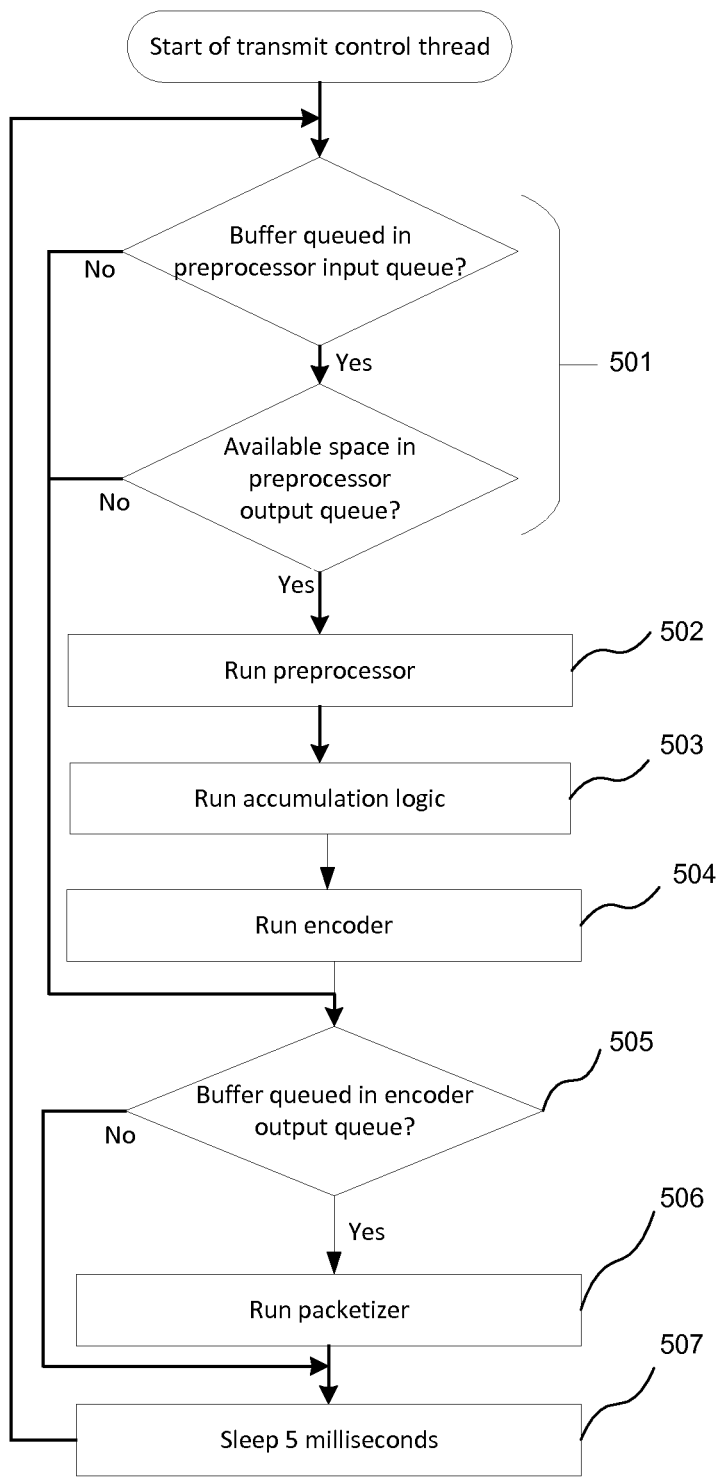
FIG. 5 illustrates an example of transmit control in a media encoder.

The operation of the encoder subsystem 102 in FIG. 1 is roughly set out in the flow diagram shown in FIG. 5, which illustrates the operation of a transmit control thread. At 501, the input and output queues of the pre-processor are checked: the input queue for a new buffer and the output queue for available space. If there is a new buffer for pre-processing and a free space to write the pre-processed buffer to then pre-processing is performed at step 502, otherwise the thread skips to step 505.

On the pre-processor completing, the pre-processed buffer is written to its output queue. This could be one and the same as the encoder input queue 106, otherwise the buffer moves from the pre-processor output queue into the encoder input queue. At step 503, the accumulation logic relating to the calculation of the accumulation parameter is run. This can occur on the buffer being received into the encoder input queue. In accordance with the examples described herein, the accumulation logic might calculate the time difference between the timestamps of the newly-received buffer and a previous buffer in the queue and add this to a running total of the accumulated time differences over the current accumulation interval. The accumulation logic also checks whether the programmed accumulation interval has ended: if the interval has ended the accumulation parameter is calculated in respect of that accumulation interval.

Figure 6:
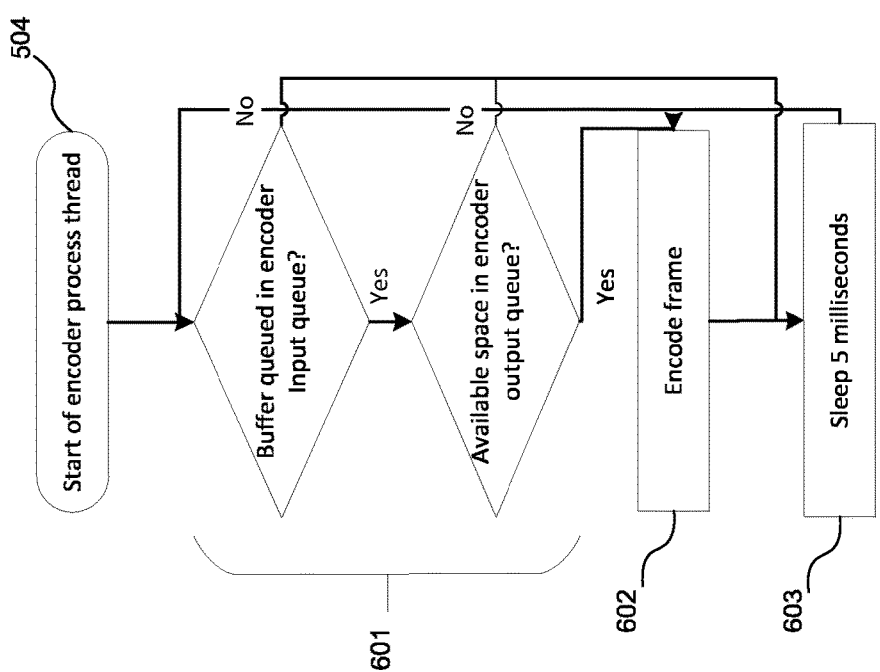
FIG. 6 illustrates an example of an encoder process in a media encoder.

Execution next passes to the encoder 104 which is called at step 504. An outline of the encoder process thread is illustrated in FIG. 6. Firstly, at step 601, the thread checks whether there is a buffer in the encoder input queue and a free buffer in the output queue: if so, the frame is encoded 602; otherwise, the thread skips the encode and cycles back to the beginning so as to wait for a new buffer to be received or an output buffer to become free.

Back in the transmit control thread of FIG. 5, the thread checks 505 whether a buffer is queued in the encoder output queue. In this example, the packetizer does not have an input queue and is decoupled from the encoder by the encoder output queue only; in other examples there could be any number of queues between the encoder and packetizer. If a buffer is present in the encoder output queue, the packetizer runs 506 so as to process the encoded buffers generated by the encoder into data packets for, say, transmission over a network as the payload of network packets.

In the event that the encoder subsystem 102 is embodied in software, it may be advantageous if both the transmit control thread and encoder process thread are mandated to sleep at the end of their respective processing loops as indicated by 507 in FIGS. 5 and 603 in FIG. 6. In some examples, the sleep period is mandatory even if there are further buffers awaiting processing in the encoder input queue. This ensures that even during overload of the encoder, processor usage will never be 100% and some processor cycles are left available for other threads running on that processor. As an example, for media encoders configured to process video frames on portable devices, a sleep period of 5 ms is often suitable.

In the above examples, it has for simplicity been assumed that each camera frame corresponds to a single data buffer, however, a camera frame could be represented by a plurality of data buffers. Equally, a single data buffer could represent more than one camera frame. Generally, a buffer can be any portion of data on which the encoder is configured to operate, with buffers being of fixed or variable size as appropriate to the particular implementation.

The adaptation controller of the examples described herein allows the load on the encoder to be managed in a manner which is independent of the particular encoder implementation. For example, the encoder subsystem could be embodied in hardware, software or any combination of hardware and software components. The adaptation controller enables accurate control of a media encoder even on a platform that utilises processor scaling (e.g. frequency adaptation in accordance with a power saving scheme) and operates well on encoders supported at both single and multi-core processors. The adaptation controller is particularly suitable for performing adaptation at a media encoder arranged to perform real-time encoding of media frames (e.g. video frames from a camera), as well as media encoders arranged to perform encoding of media frames played-out at a rate in accordance with their timestamps (e.g. a recorded stream of video frames).

It can be further advantageous to arrange that a decoder to which the encoder is providing its encoded media stream is informed of adaptation of the encoder. For example, for a pair of devices supporting a two-way video telephone link, this can help to avoid significant asymmetries in video quality. At each device, the encoder and decoder would typically be sharing resources. Thus, if a first one of the devices is more powerful than the second of the devices, or if the relative processing resources of the devices changed dynamically due to (e.g.) processor scaling effected for various reasons, it is possible to have a situation where the first device transmits a high quality encoded stream to the second device which the second device can decode but at the expense of significantly limiting the resources available to the encoder of the second device. This might lead to the second device encoding and transmitting a low quality stream to the first device, and hence a significant asymmetry between the encode qualities of the video streams passing each way between the two devices.

By arranging that the encoder at each device of a communicating pair knows at least some of the encode parameters of the encoder at the other device, each encoder can avoid selecting such high quality encode settings that the other device will be forced to significantly lower its own encode quality. A decoder can be informed of adaptation of the encoder by arranging that the adaptation controller cause a signal to be transmitted with the encoded media stream to the decoder. This signal could be provided in the video stream, for example in metadata of the stream such as packet headers. Such information could be included as a further input to an adaptation algorithm of the adaptation controller so as to allow the adaptation controller to control the encode parameters of its associated encoder additionally in dependence on the received information.

To give a particular example, consider a video call between a first device encoding a video stream from its camera at 640×480 and a second device which has been forced to encode a video stream from its camera at 160×120. This would represent a macroblock processing demand ratio of 16:1. As a result of arranging that the second device inform the first device of its adaptation down to a resolution of 160×120, the first device could respond by reducing its encode resolution to 320×240. In turn the reduction in load at the second device might allow that device to increase its resolution to 320×240 and address the quality asymmetry.

In a device performing multi-party video conferencing, quality asymmetry can be inherently present and allowed by design since displayed video is a result of decoding streams from one or more participants which places a higher demand on available computing resources, potentially leaving fewer resources available for the encoder. In this scenario, the decoder macroblock processing demand associated with the various video streams (perhaps expressed as an average or maximum value) or some other (potentially normalized) metric may be compared with the encoder demand at the device to identify imbalances in quality asymmetry. In order to balance the quality asymmetry, the encoder may signal to one or more devices in the manner described above so as to cause them to alter their respective encode qualities.

Generally, an encoder subsystem as described herein will form part of a media codec (encoder-decoder) of a data processing system. A calibration system for such a codec will now be described.

Figure 7:
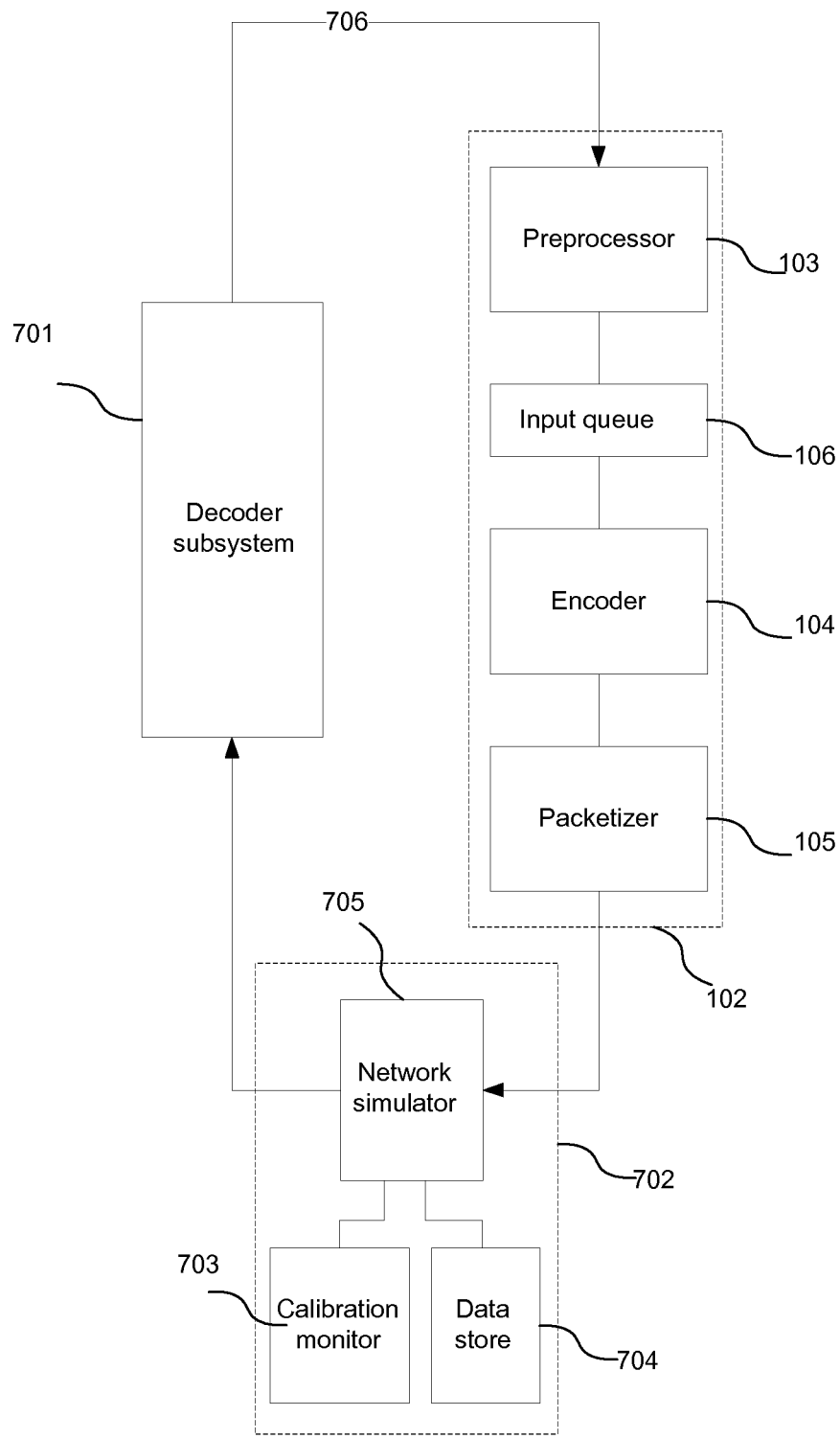
FIG. 7 is a schematic diagram of a calibration system for an adaptive media encoder.

FIG. 7 is a schematic diagram of a data processing system having a calibration system 702 for calibrating an adaptive codec comprising an encoder subsystem 102 and a decoder subsystem 701. The encoder subsystem performs encoding in accordance with a set of one or more encode parameters (e.g. a target encode bitrate). As shown in FIG. 7, the encoder subsystem 102 could be the same encoder subsystem described in relation to FIGS. 1 to 6, comprising a pre-processor 103, input queue 106, encoder 104, and packetizer 105. More generally however, the calibration system described herein could be used with any encoder subsystem arranged to perform encoding in accordance with a set of one or more encode parameters, the demand on the encoder subsystem varying in dependence on the encode parameters.

Media frames encoded and decoded by the codec are associated with timestamps so as to enable the media stream to be presented at the correct rate. A frame could comprise its associated timestamp or the timestamps could be provided separately—for example, as a stream of timing information associated with the stream of media frames. However the timestamps are associated with the frames, the frames can be said to be time-stamped.

As has been discussed, it is often difficult to identify the encode and decode capabilities of a data processing system at any given point in time because of the complexity of the underlying architecture, processor scaling, and the competition for resources by other processes or hardware operating in the data processing system. The calibration system provides a mechanism for identifying the set of encode parameters which correspond to the greatest steady-state demand on the media codec that allows a decoder of the decoder subsystem 701 to perform decoding at the rate indicated by the timestamps. In other words, the calibration system identifies the maximum capability of the codec at the point at which the calibration is performed.

Calibration system 702 comprises a calibration monitor 703 and data store 704. The calibration system 702 can be arranged to perform calibration of the media codec on the codec entering a calibration mode. Such a calibration mode could be selected, for example, by a user of the device at which the codec is embodied, periodically, or in response to a predetermined trigger such as the installation of application in a device or first time power-up of an embedded device after factory reset.

The data store 704 holds an encoded media stream representing a sequence of time-stamped frames. In order to calibrate the media codec, the calibration monitor 703 causes the stored encoded media stream to be played-out from the data store to the decoder subsystem 701 so as to cause the decoder subsystem to decode the frames. Further, the output 706 of the decoder subsystem is fed back to the input of the encoder subsystem 102 so as to cause the decoded frames to be re-encoded back into an encoded media stream (which may or may not be in the form of data packets, depending on whether packetizer 105 is present and forms part of the encode path in the encoder subsystem). The re-encoded media stream is then looped back into the decoder subsystem for decoding By looping the re-encoded media stream back into the decoder subsystem, a closed loop is formed between the encoder and decoder subsystems of the codec such that the demand on both the encoder and decoder subsystems varies with the encode parameters in accordance with which encoding is performed. Decoded media frames 706 pass between the decoder and encoder subsystems. If the codec becomes overloaded, the decoder will not be able to generate the stream of frames at the rate indicated by the timestamps associated with the frames. Since the encoder and decoder are coupled together, this may be due to either or both of the encoder and decoder subsystems being unable to perform encoding and/or decoding at the required rate.

In order to identify the greatest steady-state demand on the media codec that allows the decoder to perform decoding at the rate indicated by the timestamps, the encode parameters of the encoder are varied so as to increase or decrease the demand on the media codec. The variation of the encode parameters could be controlled by the calibration monitor or by an adaptation algorithm of the encoder subsystem. The calibration monitor 703 is configured to identify the steady-state demand (and associated encode parameters) above which the decoder becomes unable to perform decoding at the required rate. The maximal encode parameters associated with that highest steady-state demand can subsequently be used by the media codec when it is next called on to perform encoding.

In the event that the encoder subsystem comprises an adaptive encoder, the encoder subsystem can be configured to adapt its encode parameters in accordance with its adaptation algorithm so as to identify its maximum steady-state capabilities—this can be referred to as a "short" calibration mode. The calibration monitor identifies the encode parameters corresponding to the greatest steady-state demand on the media codec as the maximal encode parameters for the codec. The calibration monitor is not configured to cause the encode parameters to vary in this mode; the encode parameters are adapted according to any suitable adaptation algorithm in operation at or operated on the encoder subsystem. For example, the encoder subsystem could be controlled by an adaptive control system 100 as described in relation to FIG. 1. The decoder subsystem could also be adaptive, in which case the decoder subsystem can also be permitted to adapt its decode parameters in the calibration mode of the codec.

It can be advantageous to arrange that the stored media stream is played out from data store 704 so as to overload the encoder and/or decoder subsystems of the codec. In short calibration mode this forces the encoder to adapt downwards until the maximal steady-state demand is reached. A plurality of media streams could be stored at the data store with the aim of ensuring that there is a media stream suitable for the capabilities of the data processing system at which the encoder is supported (a media stream could be selected, for example, based on rough static parameters of the data processing system). Alternatively, a given stream could be played out in different ways, e.g. at different frame rates.

In "long" calibration mode, the calibration monitor can be configured to cause the encode parameters of the encoder subsystem to vary so as to identify the steady-state demand (and associated encode parameters) above which the encoder/decoder becomes unable to perform decoding at the required rate. This can be achieved by causing the codec to become overloaded so as to identify where this threshold demand lies. For example, in the long mode the calibration monitor could cause the encoder to initially operate under overload, e.g. by playing out an appropriate stored stream and setting the encode parameters to their "highest quality" values. The calibration monitor can be configured to then cause the encode parameters to step downwards to "lower quality" values (e.g. lower frame resolutions and rates) until a stable state is achieved that places the greatest demand on the codec without overloading the codec. The calibration monitor can be configured to cause the encode parameters of the encoder subsystem to vary in accordance with the adaptation algorithm of the system—for example, the adaptation algorithm of an adaptation controller as discussed with respect to FIG. 1.

It can be useful to arrange that the calibration system cause the encoder to sleep for a determined period following the encoding of each frame. This allows a stored media stream to be used to calibrate data processing systems that would not otherwise be overloaded by the stored media stream. For example, if an encoder thread operating on a 10 fps stored video stream is arranged to sleep for a period of 50 ms sleep after each successfully encoded frame, the calibration system will effectively be determining the point of overload for the encoder supported at a processor (e.g. CPU supporting the encoder thread) running at 50% of its maximum. If 75 ms sleep is inserted, then overload will be determined for the processor running at 25% of its maximum. This allows codecs supported at data processing systems having a wide range of capabilities to be calibrated by the calibration system.

It can be advantageous to arrange that the long calibration mode is run for long enough to activate time-delayed thermal throttling mechanisms available at the processing device at which the codec is supported. This ensures that the calibrated maximal steady-state demand is the maximum demand which the codec is capable of handling under thermal throttling of the processing device at which it is supported.

The calibration monitor can be configured to monitor the load at one or both of the encoder and decoder subsystems, but typically only the load at the encoder need be monitored because encoding is generally a more processor-intensive operation than decoding. The load at only one of the encoder and decoder subsystems need be monitored because the encoder and decoder are coupled together: if either one of the encoder and decoder subsystems becomes overloaded then the codec as a whole will be unable to maintain the required rate of frame processing. As appropriate to the particular codec, the calibration monitor could be further configured to cause decode parameters of the decoder subsystem to vary so as to identify the demand (and associated encode and decode parameters) above which the encoder/decoder becomes unable to perform decoding at the required rate. The decode parameters could be varied in dependence on the encode parameters selected for the encoder. Typically however, the decode parameters of the decoder subsystem would be inferred from the encoded stream it receives for decoding.

The calibration system can support one or both of the short and long calibration modes. The system can make the encode parameters or a measure of the demand corresponding to those parameters (e.g. in macro blocks per second) to the codec or other components of the device at which the codec is supported. This performance information can be used as a measure of the capabilities of the codec and, in the case that the codec is a video telephony codec, the performance information can be used in call negotiation.

It can be advantageous to arrange that, when the media encoder is not in a calibration mode and the encoder subsystem achieves steady-state encoding of a media stream through adaptation of its encode parameters, the calibration system stores those encode parameters corresponding to the steady-state as calibration estimates. The encoder subsystem can then make use of those estimated encode parameters the next time it is called upon to perform encoding. For example, for an encoder of a device for performing video telephony, the estimated encode parameters can be used in the absence of calibrated encode parameters when a new connection or call is established to a receiving device. Such estimated encode parameters could be used, for example, if the media codec is not able to perform calibration before it is next called upon to perform encoding, or if stored calibrated encode parameters obtained through performance of calibration routines are older than a predefined length of time. The calibration system can be configured to store estimated encode parameters used at the encoder subsystem in response to overload occurring and, through adaptation, a set of steady-state encode parameters being reached.

In the event that the media frames are video frames, in order to allow for the additional demands on the encoder subsystem associated with frame rescaling, it is advantageous to arrange that the encoder subsystem perform rescaling of the media frames it receives. For example, the calibration monitor can be configured to cause pre-processor 103 to perform rescaling by reducing the size of received frames 706. The corresponding demand (e.g. in macroblocks per second) on the encoder subsystem can then include the processing overhead associated with the rescaling operation.

For codecs for use at a device arranged to communicate encoded media data over a network, it is further advantageous if an optional network simulator 705 is provided to introduce a predefined rate of data loss and/or jitter into the encoded media stream. For example, data packets carrying the encoded media stream and generated at packetizer 105 can be passed through the network simulator in order to introduce a given level of packet loss and/or jitter into the packet stream prior to delivery back to the decoder subsystem. This ensures that any processing loads resulting from packet errors are taken into account in the calibration process. The level of packet loss and/or jitter could be, for example, fixed, or could be selected in response to levels of packet loss and/or jitter measured by the device at which the codec is provided.

The adaptive control system and media encoder of FIG. 1, and the calibration system and media codec of FIG. 7, are shown as comprising a number of functional blocks. This is for illustrative purposes only and is not intended to define a strict division between different parts of hardware on a chip or between different programs, procedures or functions in software. The adaptive control system may or may not form part of the encoder subsystem, and the calibration system may or may not form part of the codec.

In the particular examples described herein, a frame is a frame of a video stream. A video stream could be encoded according to, for example, an MPEG or ITU standard, such as H.264. More generally however, a frame is any chunk of media data, such as a portion of an audio stream.

Data processing systems configured in accordance with the present invention could be embodied in hardware, software or any suitable combination of hardware and software. A data processing system of the present invention could comprise, for example, software for execution at one or more processors (such as at a CPU and/or GPU), and/or one or more dedicated processors (such as ASICs), and/or one or more programmable processors (such as FPGAs) suitably programmed so as to provide functionalities of the data processing system, and/or heterogeneous processors comprising one or more dedicated, programmable and general purpose processing functionalities. In preferred embodiments of the present invention, data processing systems comprise one or more processors and one or more memories having program code stored thereon, the data processors and the memories being such as to, in combination, provide the claimed data processing systems and/or perform the claimed methods.

The term software as used herein includes executable code for processors (e.g. CPUs and/or GPUs), firmware, bytecode, programming language code such as C or OpenCL, and modules for reconfigurable logic devices such as FPGAs. Machine-readable code includes software and code for defining hardware, such as register transfer level (RTL) code as might be generated in Verilog or VHDL.

Any one or more of the data processing methods described herein could be performed by one or more physical processing units executing program code that causes the unit(s) to perform the data processing methods. Each physical processing unit could be any suitable processor, such as a CPU or GPU (or a core thereof), or fixed function or programmable hardware. The program code could be stored in non-transitory form at a machine readable medium such as an integrated circuit memory, or optical or magnetic storage. A machine readable medium might comprise several memories, such as on-chip memories, computer working memories, and non-volatile storage devices.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. An adaptive control system for a media encoder configured to encode a media data stream in accordance with a set of one or more encode parameters, the system comprising:
an input queue configured to receive a sequence of data portions representing the media data stream, each data portion having an associated timestamp; and
an adaptation controller configured to generate an accumulation parameter indicative of an incidence of accumulation events at the input queue within an accumulation interval, each accumulation event representing reception of an incoming data portion into the input queue while a previous data portion in the sequence is in the input queue;
wherein the adaptation controller is further configured to:
on each accumulation event occurring in the input queue within the accumulation interval, calculate the time difference between the timestamp of the incoming data portion and the timestamp of the previous data portion,
form the accumulation parameter by summing over the time differences calculated in respect of the accumulation events occurring within the accumulation interval and expressing the sum of the time differences as a proportion of the accumulation interval, and
control the encode parameters of the media encoder in dependence on the accumulation parameter.

2. The adaptive control system as claimed in claim 1, the adaptation controller being configured to control the encode parameters of the media encoder so as to adapt the encoding performed by the media encoder in response to variations in resources available to the media encoder.

3. The adaptive control system as claimed in claim 1, the accumulation parameter representing a measure of the proportion of data portions received into the input queue that result in accumulation events.

4. The adaptive control system as claimed in claim 1, the adaptation controller being configured to, on reaching the end of the accumulation interval, control the set of encode parameters of the media encoder in dependence on the accumulation parameter calculated in respect of the accumulation interval.

5. The adaptive control system as claimed in claim 1, the adaptation controller being configured to use the accumulation parameter as a measure of load on the media encoder in an adaptation algorithm arranged to control the set of encode parameters of the media encoder so as to substantially maintain the load on the media encoder within predetermined bounds.

6. The adaptive control system as claimed in claim 5, the adaptation controller being configured to use the accumulation parameter as a measure of load on the media encoder by comparing the accumulation parameter to a set of threshold values so as to identify a corresponding one of a plurality of load metrics for use in the adaptation algorithm.

7. The adaptive control system as claimed in claim 6, the adaptation controller being configured to make use of a hysteresis component in performing said comparison so as to prevent changes in the load metric due to small changes in the accumulation parameter.

8. The adaptive control system as claimed in claim 1, further comprising a data store holding a hierarchy of sets of one or more encode parameters each having an associated demand on the media encoder, the adaptation controller being arranged to select between causing the media encoder to, in dependence on the measure of load represented by the accumulation parameter:
maintain its current set of encode parameters;
adapt upward to a set of encode parameters associated with a greater demand on the media encoder; and
adapt downward to a set of encode parameters associated with a lesser demand on the media encoder.

9. The adaptive control system as claimed in claim 8, wherein the associated demand held in the data store for each set of encode parameters represents a minimum data processing rate required of the media encoder.

10. The adaptive control system as claimed in claim 8, the adaptation controller being configured to, in response to causing the media encoder to adapt upwards and subsequently to adapt back downwards within a predetermined length of time, not cause the media encoder to adapt upwards within an adaptation interval.

11. The adaptive control system as claimed in claim 10, wherein the adaptation interval is calculated by increasing the current value of the adaptation interval substantially in proportion to the current value of the adaptation interval.

12. The adaptive control system as claimed in claim 10, wherein the adaptation interval is calculated by increasing the current value of the adaptation interval substantially in proportion to the ratio of a measure of the demand on the media encoder associated with the next encode parameters up in the hierarchy to a measure of the demand on the media encoder associated with the current encode parameters in the hierarchy.

13. The adaptive control system as claimed in claim 1, wherein each data portion received into the input queue includes an associated timestamp and the sequence of data portions is received at the input queue such that consecutive data portions in the sequence are received spaced apart in time substantially in accordance with their respective timestamps.

14. The adaptive control system as claimed in claim 1, the input queue being decoupled from the source of the data portions such that the rate of reception of data portions at the input queue does not depend on the rate of encoding of the data portions by the media encoder.

15. A method of controlling a media encoder that encodes a media data stream in accordance with a set of one or more encode parameters, the method comprising:
receiving a sequence of data portions representing the media data stream at an input queue, each data portion having an associated timestamp; and
generating an accumulation parameter indicative of an incidence of accumulation events at the input queue, each accumulation event representing the reception of an incoming data portion into the input queue while a previous data portion in the sequence is in the input queue;
wherein the step of generating an accumulation parameter comprises:
on each accumulation event occurring in the input queue within an accumulation interval, calculating a time difference between the timestamp of the incoming data portion and the timestamp of the previous data portion,
summing over the time differences calculated in respect of the accumulation events occurring within the accumulation interval, and
expressing the sum of the time differences as a proportion of the accumulation interval, said proportion being the accumulation parameter; and
controlling the encode parameters of the media encoder in dependence on the accumulation parameter.

16. A non-transitory computer readable storage medium having stored thereon computer readable instructions that, when executed at a computer system for generating a representation of a digital circuit from definitions of circuit elements and data defining rules for combining those circuit elements, cause at least one processor of the computer system to generate an adaptive control system comprising:
an input queue configured to receive a sequence of data portions representing a media data stream, each data portion having an associated timestamp; and
an adaptation controller configured to generate an accumulation parameter indicative of an incidence of accumulation events at the input queue within an accumulation interval, each accumulation event representing reception of an incoming data portion into the input queue while a previous data portion in the sequence is in the input queue;
wherein the adaptation controller is further configured to:
on each accumulation event occurring in the input queue within the accumulation interval, calculate the time difference between the timestamp of the incoming data portion and the timestamp of the previous data portion,
form the accumulation parameter by summing over the time differences calculated in respect of the accumulation events occurring within the accumulation interval and expressing the sum of the time differences as a proportion of the accumulation interval, and
control the encode parameters of the media encoder in dependence on the accumulation parameter.

17. A non-transitory computer readable storage medium having stored thereon computer executable instructions that when executed cause at least one processor to:
receive a sequence of data portions representing a media data stream at an input queue, each data portion having an associated timestamp;
generate an accumulation parameter indicative of an incidence of accumulation events at the input queue, each accumulation event representing the reception of an incoming data portion into the input queue while a previous data portion in the sequence is in the input queue;
wherein the step of generating an accumulation parameter comprises:
on each accumulation event occurring in the input queue within an accumulation interval, calculating a time difference between the timestamp of the incoming data portion and the timestamp of the previous data portion,
summing over the time differences calculated in respect of the accumulation events occurring within the accumulation interval, and
expressing the sum of the time differences as a proportion of the accumulation interval, said proportion being the accumulation parameter; and
control encode parameters of a media encoder configured to encode said data portions in dependence on the accumulation parameter.

\* \* \* \* \*